W. F. FOLMER.
FILM CAMERA.
APPLICATION FILED OCT. 25, 1915.
1,260,356.
Patented Mar. 26, 1918.
4 SHEETS—SHEET 1.
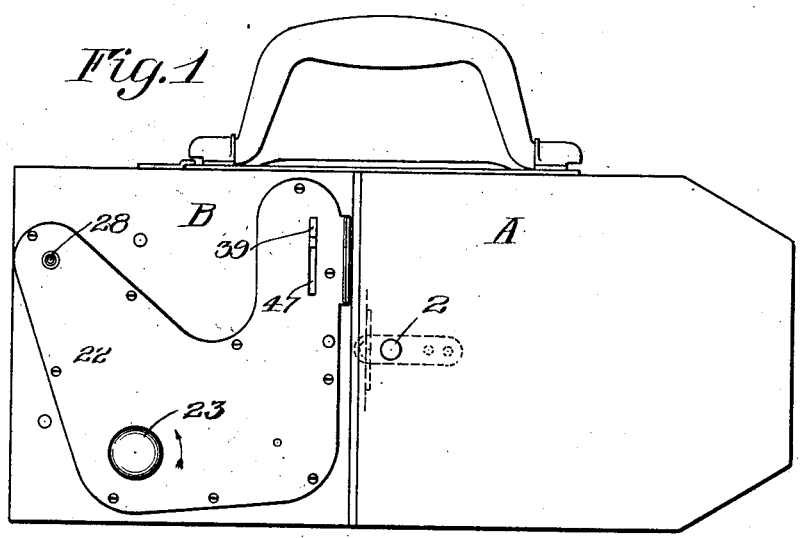
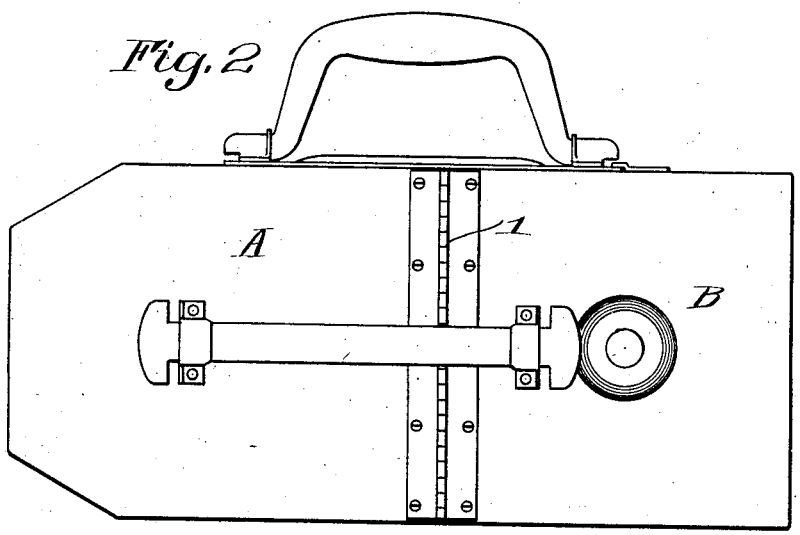
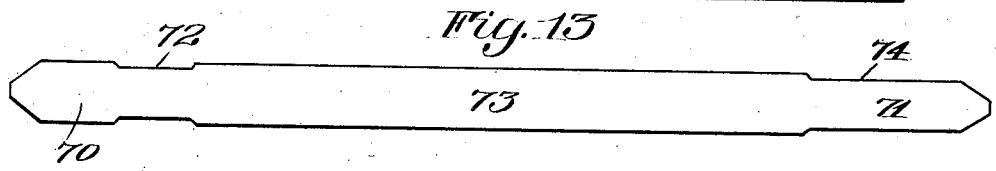
WITNESSES:
INVENTOR.
William F. Folmer
BY
his ATTORNEYS.

W. F. FOLMER.
FILM CAMERA.
APPLICATION FILED OCT. 25, 1915.
1,260,356.
Patented Mar. 26, 1918.
4 SHEETS—SHEET 2.
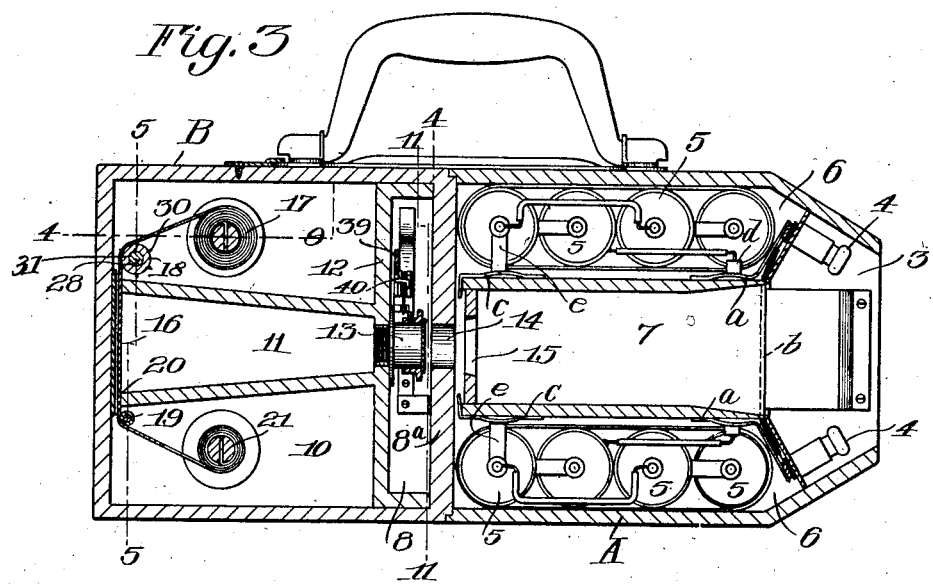
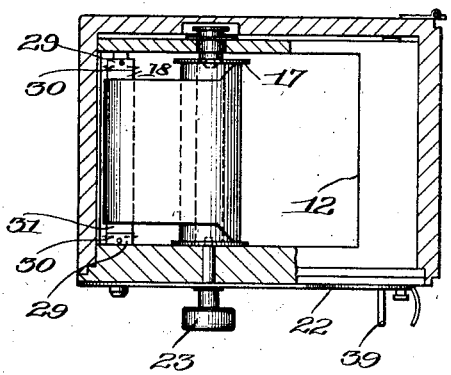
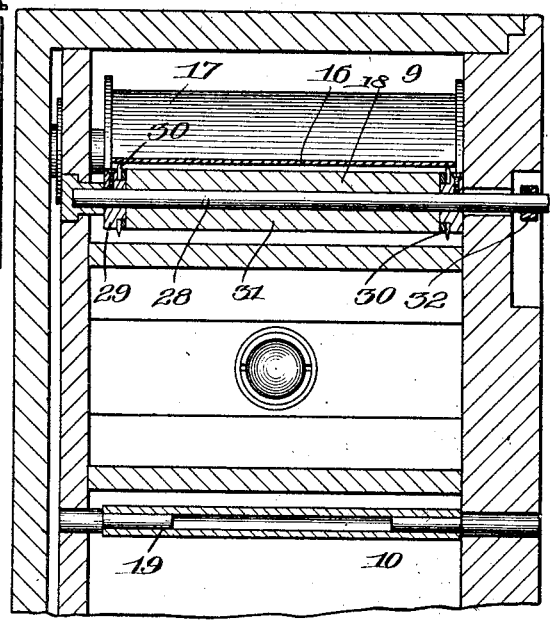
WITNESSES
INVENTOR.
William F. Folmer
BY
his ATTORNEYS.

W. F. FOLMER.
FILM CAMERA.
APPLICATION FILED OCT. 25, 1915.

1,260,356.

Patented Mar. 26, 1918.
4 SHEETS—SHEET 3.

WITNESSES:

INVENTOR.
William F. Folmer
BY
his ATTORNEYS.

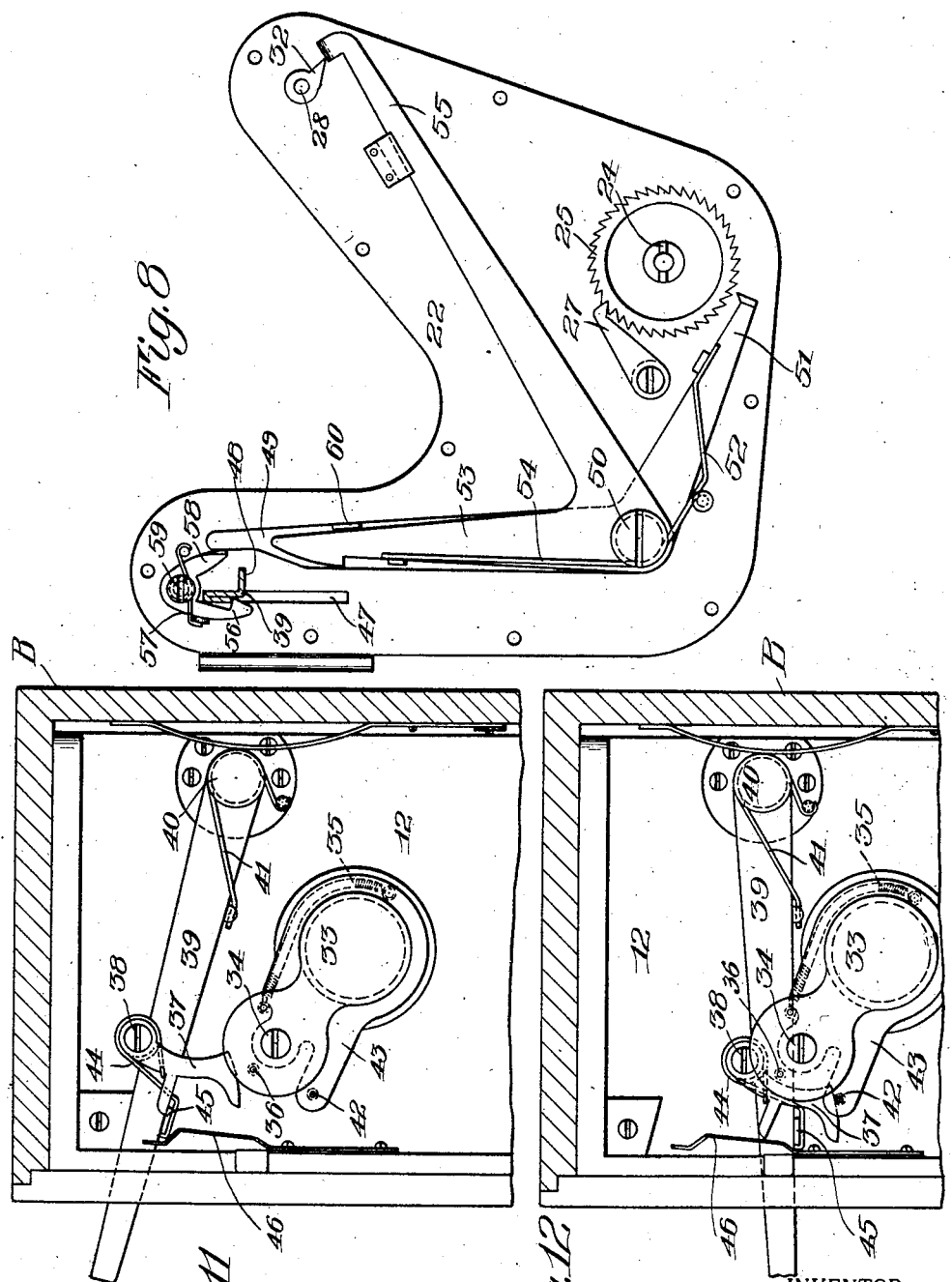

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

FILM-CAMERA.

1,260,356.

Specification of Letters Patent.

Patented Mar. 26, 1918.

Application filed October 25, 1915. Serial No. 57,665.

*To all whom it may concern:*

Be it known that I, WILLIAM F. FOLMER, of Rochester, in the county of Monroe and State of New York, have invented certain new and useful Improvements in Film-Cameras; and I do hereby declare the following to be a full, clear, and exact description of the same, reference being had to the accompanying drawings, forming a part of this specification, and to the reference-numerals marked thereon.

My present invention relates to photography and more particularly to photographic cameras and it has for its object to provide a roll holding or film camera during the operation of which certain checks will be placed upon the user that will prevent him from wasting film; from making more than one exposure upon a single picture area of the film and from operating the shutter in the belief that he is making a photographic record when, in fact, the proper film surface is not in position to receive exposure. To the above ends and with these and other objects the invention resides in certain improvements and combinations of parts all as will be hereinafter more fully described, the novel features being pointed out in the claims at the end of the specification.

In the drawings:

Figure 1 is a side elevation of a photographic camera constructed in accordance with and illustrating one embodiment of my invention;

Fig. 2 is a similar view of the camera taken from the other side;

Fig. 3 is a central vertical longitudinal section through the camera;

Fig. 4 is a fragmentary horizontal section taken substantially on the line 4—4 of Fig. 3;

Fig. 5 is an enlarged transverse vertical section taken substantially on the line 5—5 of Fig. 3 with the lower portion of the camera case broken away;

Figure 6:
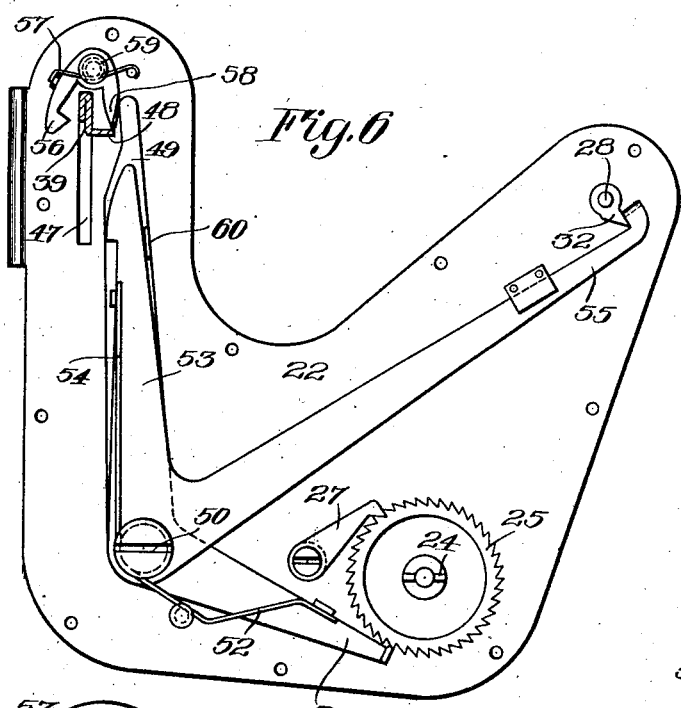
Figure 9:
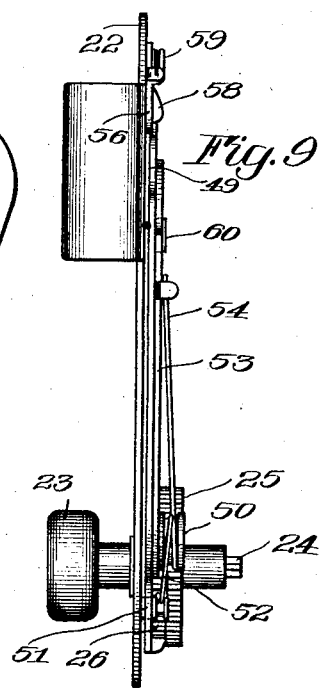
Figure 7:
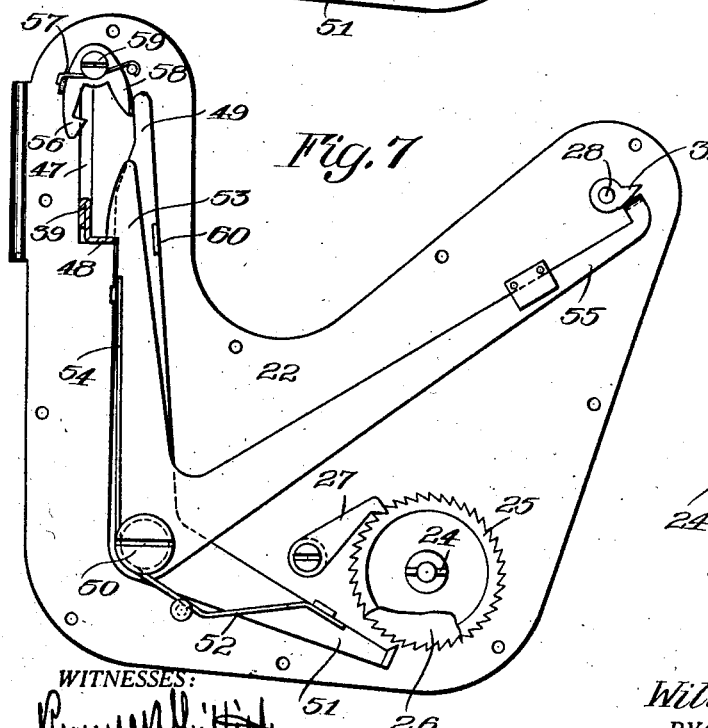
Figure 10:
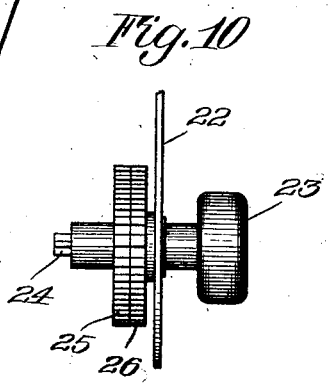

Figs. 6, 7, and 8 are enlarged elevations of the inner side of the plate carrying the interlocking connections between the shutter mechanism and the film winding mechanism and respectively showing the parts in different positions successively assumed in the operation of the camera;

Fig. 9 is an edge view of the plate;

Fig. 10 is a detail elevation of the film winding device;

Fig. 11 is an enlarged transverse section taken substantially on the line 11—11 of Fig. 3 showing the shutter mechanism before it is actuated, the lower portion of the camera casing being broken away;

Fig. 12 is a similar view showing the position of the parts after the shutter has been actuated, and Fig. 13 is a plan view of the film strip.

Similar reference numerals throughout the several figures indicate the same parts.

The specific camera in connection with which I have illustrated my invention in the present instance is one designed for photographically recording the readings of gas and electric meters and I will first describe the general construction of this camera.

The body thereof is divided at or near the center into two casings A and B hinged together at 1 so that they may be partially separated to give access to the interior of casing A. On the side opposite to the hinge is a suitable catch 2 for holding them locked together. At the front of section A is a light chamber 3 containing object illuminating devices 4 in the present form of electric lamps. In use, the open front of the camera is laid close against the face of the meter so that the latter is practically in the chamber 3 and brilliantly illuminated by the lamps 4. These lamps are supplied through a suitable circuit not shown in detail from batteries 5 occupying upper and lower chambers 6 in case A on opposite sides of a light passage 7 leading rearwardly from the light chamber 3. The chambers 6 are accessible from the rear of the casing A when the casing B is swung out of the way.

The casing B contains a shutter chamber 8, two film chambers 9 and 10 and an intermediate exposure or dark chamber 11. A partition 12 forming the front walls of the chambers 9, 10 and 11 carries the lens tube 13 in alinement with the exposure chamber 11 and the light passage 7 with which latter it communicates through an opening 14 in the front wall of section B and an opening 15 in a partition at the rear of passage 7. The film 16 is fed from a supply spool 17 over rolls 18 and 19 through the focal plane adjacent the exposure opening 20 at the rear of the chamber 11 to a winding or take-up spool 21 arranged in the lower chamber 10. The present invention has to do with this film feeding mechanism in conjunction with the shutter mechanism to be later described.

These parts are largely carried by a mounting plate 22 secured on the side wall of the casing B. In it is journaled a winding knob (Fig. 10) shown at 23 carrying a key 24 and two ratchets 25 and 26 on the inner side of the plate with the first mentioned of which ratchets coöperates a pawl 27 that permanently prevents the knob from being turned in other than the winding direction.

The roll 18 is not only a guide roll but also a measuring roll for measuring the film strip into picture lengths as it passes from the feed spool 17 and it is best shown in Figs. 3, 4 and 5. It comprises a central shaft 28 and fixed portions 29 at its ends secured to the shaft and carrying spurs 30 that engage the margins of the film and cause the latter to positively drive the roll during the winding movement. Intermediate the fixed portions 29 is a relatively movable idler 31 constituting the major part of the roll surface and which turns freely on the shaft 28 for a purpose that will hereinafter appear. The projecting outer end of the shaft 28 is provided with a trip or cam tooth 32 arranged immediately adjacent to the inner face of the plate 22.

The specific construction of the shutter mechanism, best shown in Figs. 11 and 12, constitutes a separate invention and a brief description thereof will be sufficient for the purpose of disclosing the present invention. A shutter leaf 33 pivoted at 34 normally covers the end of the lens tube 13 by reason of its own weight and the action of a spring 35. It carries a projection 36 that is engaged by a link 37 pivoted at 38 to an operating lever 39 pivoted at 40 to the partition 12. A spring 41 normally holds the operating lever in raised position. When it is depressed, the link 37 engages the projection 36 and raises or opens the leaf 33 which is later allowed to close by reason of the link 37 slipping off of the projection 36 after it comes into contact with a fixed abutment 42 supported by a plate 43 on the lens tube 13. The link 37 is normally held in engaging position by a spring 44 that holds it against a lip 45 on the lever 39 which lip traverses a spring contact 46 during the opening of the shutter. The lever and the contact 46 together form a switch in the circuit of the batteries 5 and lamps 4, so that the latter are energized coincidentally with the opening of the shutter.

The shutter operating lever 39 projects through a slot 47 in the mounting plate 22, as shown in Fig. 1, and also in Figs. 6, 7, and 8 to which last named figures attention is now directed. The normal position of the lever is shown in Fig. 6. When it is depressed to operate the shutter, a lip 48 thereon deflects one arm of a lever 49 pivoted at 50 on the inner side of the plate 22. The other arm of this lever forms a detent 51 coöperating with the ratchet 26 on the winding knob 23 that is effective in the reverse direction from the ratchet 25 so that when the detent is in engagement, winding movement of the knob is prevented. The said deflection of the lever 49 withdraws the detent 51 against the tension of its spring 52 and unlocks the winding knob.

When the shutter operating lever 39 reaches its lowermost position, as shown in Fig. 7, it is automatically engaged and held there by a detent lever 53 also pivoted at 50 and actuated by a spring 54. Another arm 55 on this detent lever 53 is in a position to be engaged and deflected by the trip tooth 32 on the shaft 28 of the measuring roll 18 and when so deflected, it withdraws the detent 53 from engagement with the lever 39. After being so released, the lever returns to its original position and is immediately engaged and locked there by a detent 56 pivoted at 59 and actuated by a spring 57. An arm 58 on the detent is engaged by the arm 49 and as the spring 52 that acts on the latter is stronger than the spring 57, it will hold the detent 56 out of engaging position except when the trip 32 on the measuring roll has deflected the lever 55 and withdrawn the detent 53 at which time the latter, through engagement with a lip 60, holds the lever 49 from pressing on the arm 58.

Assuming that a fresh area of film is opposite the exposure opening 20 ready to receive an image, the operation of the device is as follows:

The shutter operating lever 39 is depressed the full distance opening the shutter leaf 33 and allowing it to close again. The lever thus passes from the position of Fig. 6 to that of Fig. 7 in which latter position it is immediately locked by the detent 53 and it is not released so that the shutter can be actuated again until the film feeding devices have been operated to stretch a fresh area of film opposite the exposure opening 20. This same movement of the shutter lever deflects the arm 49 throwing the detent 51 which has hitherto been engaged, out of coöperation with the ratchet 26. The winding knob 23 is therefore free to turn and by means of it, a fresh area of film is drawn from the spool 17. As this winding operation progresses, the measuring roll 18 is turned by the passing film strip 16, its dimensions being such, in the present instance, that one revolution thereof is equal to the length of a picture area on the film strip in the travel of the film on its periphery. With the turning of the measuring roll, the trip 32 on the end of its shaft also makes one revolution to the left in Figs. 6, 7 and 8 and as it completes it, deflects the arm 55, as shown in Fig. 8. This causes the detent 53 to withdraw from the lip 48 and permit the lever 39 to return to its original position, as shown in Fig. 8. The deflection of the arm 49 has meanwhile allowed the detent 56 to assume its operative position and the withdrawal of the detent 53 through the medium of the lip 60 still holds the arm 49 deflected in the position of Fig. 8 when the trip 32 has given the arm 55 its maximum throw but has not yet dropped off of its engaging portion. Hence, the lever 39 is, upon its return to normal position, locked there against operative movement by the detent 56 until the trip 32 by the absolute completion of the winding movement drops off the engaging portion of the arm 55, as shown in Fig. 6. Thereupon, the arm 49 being released, goes back to normal position under the influence of its spring 52 and by engagement with the arm 58, throws the detent 56 out of the way. This same movement of the arm 49 carries the detent 51 into engagement with the ratchet 26 and locks the winding knob 23 against further winding movement. Therefore the film is prevented from further needless winding and the shutter is unlocked and the film cannot be wound again until the shutter is operated. Similarly, it will be seen from the foregoing, the shutter cannot be worked twice to double expose a given area of the film without an intervening film winding movement.

The peculiar construction of the measuring roll 18 is due to the intended use of a special film which coöperates with the measuring roll to both prevent the front or fogged end of the film from being arranged for exposure and the rear end from so controlling the automatic parts after the available portions of the strip have been used that the winding devices will be prevented from completely winding up the used film and the operator led to make a supposed exposure when, in fact, a proper film area is not in position to receive it. To these ends, I use, in the present instance, a film strip of the form shown in plan view in Fig. 13. It is preferably composed of an opaque backing such as black paper having the sensitized coating on one side. The front or leading end of the film is indicated at 70 and the rear end at 71. Near the front end both margins of the film are cut away as at 72 to clear the spurs 30 on the measuring roll 18, as shown in Fig. 4, and the rear end 71 is made narrower than the intervening picture receiving portion indicated at 72 by cutting away its margins at 74. In loading the camera, the film is contained on the spool 17 which is put in place, as shown, and the outer end of the strip is led down over the rolls 18 and 19 and its tip threaded into the roll 21. The proportions are such that this brings the narrow portion of the film at 72 over the feed rollers 18 and 19 though the wider portion at 70 allows the strip to be started centrally on the spool 21. As the camera is a daylight loading camera, this whole lead of film has become fogged including not only what is in the focal plane but the area comprised between the feed roll 17 and the measuring roll 18. Thus, if the camera were closed and the winding mechanism operated without the portion 72 of the film being cut away, a fogged area of film would be presented to the exposure opening after the winding knob became locked and the shutter released for the first exposure as heretofore described. With the present film, however, the narrow portion passes freely over the idler 31 through any desired number of rotations without acting upon the measuring device and setting the shutter for an exposure, as shown in Fig. 4. It is only when the wider picture carrying portion 73 reaches the measuring roll that the measuring starts and as this wider portion has been previously held light tight upon the spool beneath the narrow portion, the passage of the proper quantity thereof into the focal plane properly terminates the winding movement and releases the shutter for an exposure, the fogged portion having been reeled off.

In a similar manner, after the last picture area on the intermediate portion 73 of the strip has passed from the measuring roll into the focal plane, the measuring roll becomes inoperative again due to the passage thereover of the narrow rear end 71 in contact only with the idler 31. Were this not so, the rear extremity of the strip might just be leaving the measuring roll as the latter completed a rotation and set the shutter mechanism ready for an exposure. The end would drop down out of the focal plane or be disarranged therein, there being nothing to hold it taut and the operator would make an exposure of which he would receive no record as he would have no means of knowing that his roll of film was used up. When the narrow portion at the rear end is reached, the winding may be continued indefinitely and after the operator has turned the knob several times more than he usually does without releasing the shutter mechanism, he immediately knows that his film is used up and can safely open the camera without danger of fogging the last picture taken.

In a meter reading camera, it is particularly desirable that no mistakes be made and that a record of the reading be obtained on each exposure for when a mistake is made it requires a special trip back to that particular meter and even then the reading of the dial has usually changed in the meantime.

I claim as my invention:

1. The combination with a camera having an exposure opening and mechanism for feeding a film strip past said opening, of a shutter mechanism, a detent therefor and a device controlling the detent arranged to be actuated by the film strip as the latter approaches the exposure opening and before it is exposed.

2. The combination with a camera having an exposure opening and mechanism for feeding a film strip past said opening, of a film measuring roll arranged to be driven by the film strip as the latter approaches the exposure opening and before it is exposed, a shutter mechanism and a detent for the latter arranged under the control of the measuring roll.

3. The combination with a camera having an exposure opening and mechanism for feeding a film strip past said opening, of a film measuring roll arranged immediately adjacent to the exposure opening and separated therefrom by a distance less than the length of one exposure area of the film, said roll being adapted to be driven by the film strip as the latter approaches the exposure opening and before it is exposed, a shutter mechanism and a detent for the latter arranged under the control of the measuring roll.

4. The combination with a camera having an exposure opening, mechanism for feeding a film strip past said opening, a shutter mechanism, a detent therefor, and a device controlling the detent arranged to be actuated by the film strip as the latter approaches the exposure opening and before it is exposed, of a film strip having a cutaway portion near its front end adapted to clear the controlling device during the preliminary feeding movement of the feeding mechanism.

5. The combination with a camera having an exposure opening, mechanism for feeding a film strip past said opening, a shutter mechanism, a detent therefor, and a device controlling the detent arranged to be actuated by the film strip as the latter approaches the exposure opening and before it is exposed, of a film strip having a cutaway portion at its rear end adapted to clear the controlling device during the final feeding movement of the feeding mechanism.

6. The combination with a camera having an exposure opening, mechanism for feeding a film strip past said opening, a shutter mechanism, a detent therefor, and a device controlling the detent arranged to be actuated by the film strip as the latter approaches the exposure opening and before it is exposed, of a film strip constructed to permit only the intermediate portion thereof to engage and actuate the controlling device.

7. In a camera, the combination with a film feeding mechanism and a shutter mechanism, of a detent for the shutter mechanism, a film measuring roll controlling the detent and having film engaging devices at its ends adapted to coöperate with the margins of a film strip and a film strip arranged to drive the measuring roll as its intermediate portion passes thereover and having an end portion adapted to escape the engaging devices.

8. The combination with a camera having an exposure opening and mechanism for feeding a film strip past said opening, of a shutter mechanism, a detent therefor, a film measuring roll controlling the detent and having film engaging devices at its ends adapted to coöperate with the margins of a film strip, and a film strip arranged to drive the measuring roll as its intermediate picture carrying portion passes thereover in approaching the exposure opening before it is exposed, said film strip having an end portion adapted to escape the engaging devices on the measuring roll.

9. The combination with a camera having an exposure opening, mechanism for feeding a film strip past said opening, and a shutter mechanism, of a detent for the shutter mechanism, a film measuring roll controlling the detent and comprising fixed film engaging devices at its ends adapted to coöperate with the margins of a film strip and a relatively movable intermediate idler, and a film strip arranged to drive the measuring roll as its intermediate picture carrying portion passes thereover in approaching the exposure opening before it is exposed, an end portion of said strip being cut away at the margins to escape the engaging devices on the measuring roll and coöperate only with the idler.

10. In a camera, the combination with a film feeding mechanism, a shutter mechanism, and an operating member for the latter, of a detent for locking the operating member in operated position and a detent for locking it in set position, said detents being successively controlled by the film winding mechanism.

11. In a camera, the combination with a film feeding mechanism, a shutter mechanism, and an operating lever for the latter, the shutter being opened and closed during one depression of the said lever, of a detent for locking the operating lever in depressed position and a detent for locking it in set position, said detents being successively controlled in the order named by the film winding mechanism.

WILLIAM F. FOLMER.

Witnesses:
RUSSELL B. GRIFFITH,
AGNES NESBITT BISSELL.